United States Patent [19]

Land

[11] 4,099,858
[45] Jul. 11, 1978

[54] VARIABLE LIGHT TRANSMISSION OPHTHALMIC DEVICE

[75] Inventor: Edwin H. Land, Cambridge, Mass.

[73] Assignee: Polaroid Corporation, Cambridge, Mass.

[21] Appl. No.: 701,873

[22] Filed: Jul. 1, 1976

[51] Int. Cl.² ............... G02C 7/12; G02B 1/10; G02B 11/04
[52] U.S. Cl. ..................... 351/62; 351/49; 350/165; 350/66
[58] Field of Search .......... 351/44, 45, 49, 62; 350/165, 66; 427/165; 52/171

[56] References Cited

U.S. PATENT DOCUMENTS

| 1,562,350 | 11/1925 | Luckey | 351/62 X |
| 2,251,330 | 8/1941 | Fairbank | 351/49 |
| 3,622,218 | 11/1971 | Kruger | 350/165 X |

*Primary Examiner*—Paul A. Sacher
*Assistant Examiner*—Rodney Bovernick
*Attorney, Agent, or Firm*—Sheldon W. Rothstein; Stanley H. Mervis

[57] ABSTRACT

An ophthalmic device comprising superposed pairs of light polarizing elements, one pair of such elements being fixed and the other pair being rotatable with respect to the fixed pair to provide a variable light transmission feature, both immediately adjacent surfaces of the superposed elements comprising a continuous coating of a hydrophobic material.

2 Claims, 2 Drawing Figures

VARIABLE LIGHT TRANSMISSION OPHTHALMIC DEVICE

BACKGROUND OF THE INVENTION

The present invention is directed toward an ophthalmic device comprising superposed pairs of light polarizing elements, one of such pairs being fixedly retained in a frame member, while the elements of the other such pair are rotatable. The immediately adjacent surfaces of the superposed elements are each coated with a material to provide hydrophobic functionality.

The concept of providing variable light transmission characteristics to an ophthalmic device by employing a pair of light polarizing elements, one of which may be rotated with respect to the other, is not in and of itself novel. For background information on systems of this type reference should be made to U.S. Pat. No. 2,005,246 issued to E. H. Land on June 18, 1935; U.S. Pat. No. 2,251,330 issued to M. N. Fairbank on Aug. 5, 1941; U.S. Pat. No. 2,565,362 issued to V. K. Eloranta on Aug. 21, 1951; and particularly U.S. patent application Ser. No. 608,401 filed in the name of V. K. Eloranta et al. on Aug. 27, 1975. Each of the foregoing generally relate to devices for providing variable light transmission by employing light polarizers and embody a common problem in that water trapped between the rotatable and fixed lenses can produce unwanted random lens effects which are optically unpleasing to a user of the product.

BRIEF SUMMARY OF THE INVENTION

Given this background it has been discovered that by employing a coating of a hydrophobic material on both of the two adjacent surfaces of the superposed respective fixed and rotatable light polarizing elements, water trapped Between the lenses will not cause random lens effects since the coatings will prevent capillary suction of water into the viewing area between the lenses. Water that does get between the lenses will fall by gravity to a position outside the viewing area. By adjacent surfaces of the superposed pair of lenses is meant the surface of each lens which is closer to the lens with which it is superposed. In a two lens system as described herein, the adjacent surfaces would be the two surfaces which define an air gap between the lenses in the superposed lens structure. In the preferred embodiment of the present invention, the hydrophobic coating will comprise a fluorinated polymeric material.

Many materials suitable for use as in the present invention are known to the art. It is only necessary that these materials be hydrophobic, optically transparent and compatible with and exhibit sufficient adhesion to the polarizer support to prevent delamination in use.

As noted above, particularly useful materials for employment as hydrophobic coatings in the present invention are fluorinated polymers. Examples of such fluorinated polymers include perfluorinated polyolefins, for example, polytetrafluoroethylene as disclosed in U.S. Pat. No. 3,617,354. Such coatings may be applied from a solvent by vacuum deposition of the polymer or by polymerization in place of the corresponding monomer. Other fluorinated polymers include poly-(1,1-dihydropentadecafluoro-octyl acrylate); poly-(1,1-dihydropentadecafluoro-octylmethacrylate); and similar materials, such as

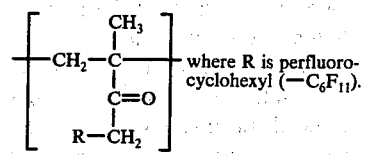

where R is perfluorocyclohexyl ($-C_6F_{11}$).

where R is perfluorocyclohexyl ($-C_6F_{11}$). Other materials include "Parylene," available from Union Carbide,; "Scotchgard," available from Minnesota Mining and Manufacturing Inc.; hydrophobic fumed silica, such as "Selanex" available from The Cabot Corp., etc.

It is to be noted that in a companion application to the present application, filed in the name of Edwin H. Land on the same date as this application, a coating of anti-reflective material is claimed in an ophthalmic device such as is described herein for employment on at least one of the adjacent surfaces of the superposed lenses. The coating of anti-reflective material eliminates reflections generated by the surfaces which define the air gap between the lenses. It has been found that the perfluorinated materials which have been described herein will provide this anti-reflection functionality if coated according to that application.

It is accordingly a primary object of the present invention to provide a variable density ophthalmic device which comprises superposed pairs of light polarizing elements wherein one of said pairs is fixedly mounted in a frame member while the other of said pairs is rotatable with respect to said fixed pairs of light polarizing elements and both adjacent surfaces of said pairs of lenses comprise a coating of a hydrophobic material.

For a fuller understanding of the nature and objects of this invention reference should be had to the following detailed description of the invention taken in connection with the accompanying drawings wherein:

FIG. 1 is a perspective rear view of an ophthalmic device of the present invention depicting a pair of rotatable lenses in position on a frame member and superposed with a pair of fixed light polarizing elements; and FIG. 2 is a partial top view of a pair of superposed lenses of the present invention showing layers of hydrophobic material on adjacent lens surfaces.

DETAILED DESCRIPTION OF THE INVENTION

Figure 1:
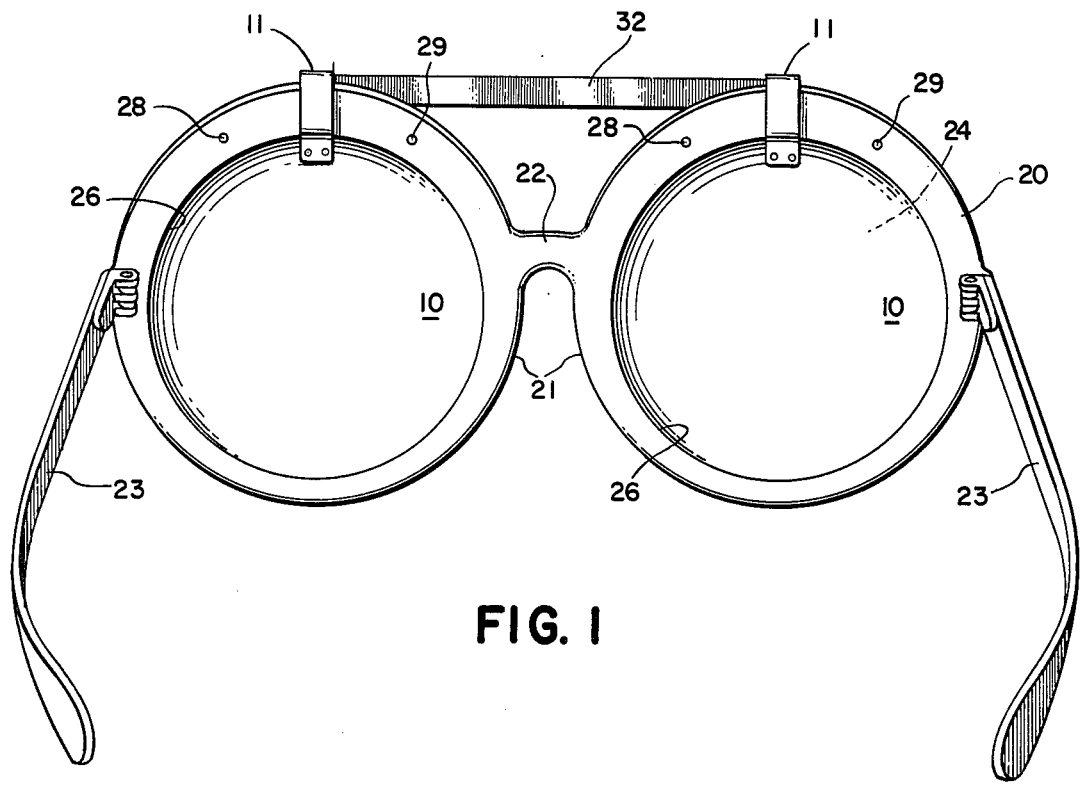

Referring to the drawings, FIG. 1 is a perspective rear view of the ophthalmic device of the present invention. Frame member 20 generally comprises two fixed light polarizing element-retaining segments 21 which are joined by bridge 22. Each of the segments are attached, at a point generally opposite the point at which they join bridge 22, to foldable frame member temples 23. Light polarizing elements 24, which are fixed in place, are seated in a conventional channel in frame member segments 21. Rotatable light polarizing elements 10 are superposed on light polarizing elements 24 and constrained from radial movement by lips 26 which are preferably annular channels, though they may comprise discontinuous segments which are in loose abutment with the outer periphery of circular polarizers 10. The biasing means 11 are generally U-shaped members which hug the spectacle frame member segments 21 and generally bias lenses 10 in an abutting relationship with lenses 24 or with a lip provided in frame segments 21 to keep the viewing area of light polarizing element 10 from directly rubbing against light polarizing element 24. The arcuate area of travel of the rotatable lenses is essentially defined by stops 28 and 29 which limit the travel of the biasing means and essentially fix the amount of rotation through which light polarizing elements 10 can travel. In an embodiment where rotatable light polarizing elements 10 are biased against fixed light polarizing elements 24, even if the elements were identically curved, the inner surface of one would have a different curvature than the outer surface of the other (different diameters). The thicker the lenses the greater the difference. Accordingly, the only contact between the elements will be along the outer edges. It may be desirable, however, to go further. For example, in one embodiment the fixed light-polarizing element may have a curvature of about 6 diopters, while the rotatable light-polarizing element will have a curvature of about 5½ diopters. Connecting the biasing means 11 is a tie bar 32 which permits equal rotation of both rotatable lenses at the same time. Complete details of spectacles of this type with rotatable light-polarizing elements superposed with fixed light-polarizing elements are described in U.S. application Ser. No. 608,401 mentioned hereinabove and incorporated herein by reference.

Figure 2:
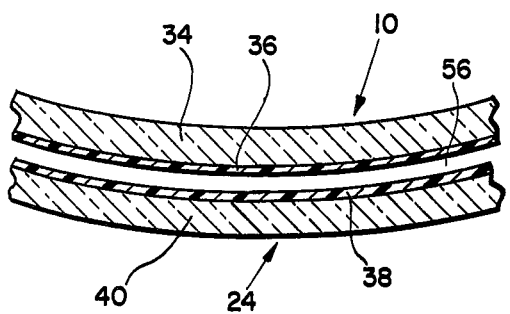

Referring now to FIG. 2, a partial top view of the superposed lenses of the preferred embodiment of the present invention is shown. Rotatable light-polarizing lens 10 is depicted slightly offset from fixed light-polarizing lens 24. Both lenses 24 and 10 comprise, respectively, light polarizing elements 34 and 40, each of which is coated on its surface adjacent the other lens with hydrophobic coatings 36 and 38, respectively. The coated surfaces define air gap 56.

Without the coatings of the present invention, water which inadvertently gets between the lenses is trapped in random areas by capillarity. The trapped water acts as a lens thereby altering the path of light through the area between the lenses which it occupies. Water droplets essentially "stick" to the lens surfaces.

With a hydrophobic coating, water droplets no longer adhere to the lens surfaces but fall by gravity outside the viewing area. These may be removed or may remain adjacent the lower frame member portion outside the viewing area.

Since certain changes may be made in the above invention without departing from the scope of the invention herein involved, it is intended that all matter contained herein or shown in the accompanying drawings shall be interpreted as illustrative and not in a limiting sense.

What is claimed is:

1. In an ophthalmic device comprising a spectacle frame member adapted to engage first and second pairs of light polarizing elements, a first pair of light polarizing elements fixedly held by said frame member, and a second pair of light polarizing elements which is superposed with the first pair of light polarizing elements and rotatable with respect to said first pair of light polarizing elements to provide variable light transmission, the improvement which comprises a hydrophobic coating on each of the immediately adjacent surfaces of said fixed and rotatable light polarizing elements.

2. The ophthalmic device of claim 1 wherein said hydrophobic coating comprises a fluorinated polymer.

* * * * *